United States Patent Office 3,636,162
Patented Jan. 18, 1972

3,636,162
ETHER PRODUCTION
Harold Chung and Wilhelm Keim, Berkeley, Calif., assignors to Shell Oil Company, New York, N.Y.
No Drawing. Continuation-in-part of application Ser. No. 653,032, July 13, 1967. This application Oct. 27, 1969, Ser. No. 869,931
Int. Cl. C07c 43/20
U.S. Cl. 260—612 D
4 Claims

ABSTRACT OF THE DISCLOSURE

Aromatic 2,7-alkadienyl ethers are produced by a dimerization-addition reaction of phenols with conjugated alkadienes, e.g., butadiene, in the presence of nickel complexed with triaryl phosphite ligands. The unsaturated ethers are useful for conversion to epoxides.

CROSS REFERENCES TO RELATED APPLICATIONS

This application is a continuation-in-part of copending application of Harold Chung and Wilhelm Keim, U.S. Ser. No. 653,032, filed July 13, 1967 and now abandoned.

BACKGROUND OF THE INVENTION

Methods are available in the art for the dimerization of conjugated dienes under conditions whereby a hydrocarbon derivative of the diene dimer is observed. For example, E. A. Zuech and R. A. Gray, U.S. Pat. 3,310,591, issued Mar. 21, 1967, disclose the production of cyclic dimers, such as 1,5-cyclooctadiene, of conjugated dienes, such as butadiene, utilizing certain nickel-containing catalysts. J. Feldman, B. A. Saffer and O. D. Frampton, U.S. Pat. 3,284,529, issued Nov. 8, 1966, disclose the production of hydrocarbon acyclic dimers, e.g., octatrienes, of conjugated dienes, e.g., butadiene, utilizing zero-valent nickel catalysts derived from nickel carbonyl in combination with phenol co-catalyst. None of these references disclose diene dimerization concomitant with addition of, for example, a hydroxyl-containing reagent to produce a diene dimer containing a functional group, i.e., a dienyl ether. In copending application of E. J. Smutny, U.S. Ser. No. 455,965, filed May 14, 1965, now abandoned, diene dimer derivatives wherein the diene moieties have dimerized in a linear manner concomitant with addition of hydroxy-containing reagents to produce ethers have been obtained utilizing palladium-, platinum- of ruthenium-containing catalyst.

SUMMARY OF THE INVENTION

It has now been found that aromatic 2,7-alkadienyl ethers are produced by reacting phenols with conjugated alkadienes in the presence of certain nickel-containing complexes as catalyst. Although the mechanism of the condensation process is not completely understood, the process of the invention results in the efficient production of ethers, one moiety of which is derived from the phenol reactant and the other moiety of which may be considered as derived from a dimer of the diene reactant. By way of illustration, from the reaction of phenol and butadiene in the process of the invention is obtained 1-phenoxy-2,7-octadiene.

DESCRIPTION OF PREFERRED EMBODIMENTS

The conjugated diene employed as a reactant in the process of the invention is an α,ω-conjugated alkadiene having only hydrogen substituents on the terminal carbon atoms of a four-carbon chain. Dienes with nonhydrogen substituents on the internal, i.e. nonterminal, carbon atoms are suitably employed, provided that the internal-carbon substituents do not unduly sterically hinder the diene dimerization. A preferred class of diene reactants comprises vicinal dimethylidenealkane of from 4 to 6 carbon atoms, or described alternatively, butadiene having from 0 to 2 internal-carbon methyl substituents. These diene compounds are butadiene, isoprene and 2,3-dimethylbutadiene. Of these, butadiene is particularly preferred.

The process of the present invention is broadly applicable to a wide variety of compounds incorporating within their structure at least one phenolic hydroxyl group and the process is suitably employed with phenols of complex or of comparatively simple structure. Best results are obtained when phenols of comparatively simple structure are employed such as when the phenol reactant comprises a mono-to di-nuclear aromatic compound possessing at least one hydroxyl substituent on at least one six-membered carbocyclic aromatic ring and having from 6 to 24 carbon atoms. The phenol reactant is the same as that described in Canadian Pat. No. 794,394, issued Sept. 10, 1968, corresponding to the above-mentioned copending U.S. application Ser. No. 455,965, filed May 14, 1965, now abandoned. The phenol reactant has from 1 to 3, preferably from 1 to 2, hydroxyl groups attached to each ring, and when the phenol is dinuclear, the aromatic rings are suitably fused, are attached directly by carbon-carbon bonds between ring carbon atoms, ore are connected by an alkylene bridge of from 1 to 12 carbon atoms. The phenol reactant is an unsubstituted phenol, that is, contains no substituents other than hydrogen and hydroxyl on the aromatic ring(s) or alternatively is a substituted phenol containing ring-carbon substituents other than hydrogen or hydroxyl, which substituents are hydrocarbyl, i.e., contain only atoms of carbon and hydrogen, or are non-hydrocarbyl containing atoms such as halogen, nitrogen or oxygen. When the phenol reactant is substituted, it is preferred that each substituent be an electron-donating substituent, which term is herein employed to indicate a substituent which is generally considered to be ortho-para directing when attached to an aromatic ring. Illustrative of such electron-donating substituents are alkyl including cycloalkyl, halogen, particularly halogen of atomic number from 17 to 35, i.e., chlorine and bromine, alkoxy, aryloxy, dialkylamino, halomethyl and the like.

Exemplary mononuclear phenol reactants include phenol, p-chlorophenol, m-bromophenol, p-ethylphenol, 2,6-dimethylphenol, p-tert-butylphenol, p-methoxyphenol, p-cyclohexylphenol, m-hexylphenol, 2,4-diethylphenol, p-dimethylaminophenol, hydroquinone, resorcinol, ethylhydroquinone, 2,5-dichlorohydroquinone, phloroglucinol, and 5-methoxyresorcinol. Dinuclear phenols are illustrated by dinuclear phenols wherein the rings are fused, such as α-naphthol,
β-naphthol,
1,4-dihydroxynaphthalene,
1,5-dihydroxynaphthalene,
1,4,6-trihydroxynaphthalene,
4-chloro-1,8-dihydroxynaphthalene,
4,8-dimethyl-1,5-dihydroxynaphthalene and
8-hydroxyquinoline;

dinuclear phenols wherein the rings are attached directly by carbon-carbon bonds between ring carbon atoms, e.g., phenylphenol,
4,4'-dihydroxybiphenyl,
2,4'-dihydroxybiphenyl,
3,4',5-trihydroxybiphenyl,
2,2'-dichloro-4,4'-dihydroxybiphenyl,
3,3'-dihydroxy-5,5'-diethylbiphenyl and
3,4'-dihydroxy-5-butylbiphenyl, and dinuclear phenols wherein the rings are joined by an alkylene bridge of from 1 to 12 carbon atoms such as bis(4-hydroxyphenyl)methane,
2,2-bis(4-hydroxyphenyl)propane,
1,2-bis(3,5-dihydroxyphenyl)ethane,
3,3-bis(2-chloro-4-hydroxyphenyl)hexane,
bis(3-hydroxy-5-methylphenyl)methane,
bis(2,6-dimethyl-4-hydroxyphenyl)methane and
2,2-bis(2-propoxy-4-hydroxyphenyl)butane.

In general hydrocarbon or halohydrocarbon phenols that is, the nuclear halogenated phenols, generically designated (halo)hydrocarbon phenols, are preferred over phenols having non(halo)hydrocarbyl substituents, and particularly preferred are unsubstituted mono- to di-nuclear phenols wherein each aromatic ring possesses a single hydroxyl substituent.

The optimum ratio of phenol reactant to conjugated diene will depend in part upon the functionality of the reactant, that is the number of hydroxyl groups present in the phenol reactant molecule, as well as the extent of reactant conversion that is desired. Ratios of moles of diene to moles of phenolic hydroxyl group as low as about 1:4 are suitable. However, to obtain higher conversions, an excess of diene is preferred and ratios of moles of diene to moles of phenolic hydroxyl group from about 2:1 to about 5:1 are more satisfactory, with best results being obtained when ratios of moles of diene to moles of phenolic hydroxyl group from about 3:1 to about 4.5:1 are utilized.

The catalyst composition employed in the process of the invention is nickel complexed with triaryl phosphite ligands. Without wishing to be bound by any particular theory, it appears that the chemical transformations during the course of the reaction which involve the catalyst are quite complex, probably involving the formation and destruction of complexes between the nickel moiety and the diene reactant and/or the presumed diene dimer intermediate, so that no one formula suitably describes the actual catalytic species. In one modification of the process of the invention, catalyst is introduced or produced in situ in a form represented by the formula $$L_4Ni$$

wherein L represents the phosphite complexing ligand. The complexing ligand L may be represented by the formula $$(RO)_3P$$

wherein R independently is an aryl group of up to 20 carbon atoms, preferably of up to 10, and having only aromatic unsaturation. R is therefore aromatic is character, preferably mononuclear aromatic, and is hydrocarbyl, that is, contains only atoms of carbon and hydrogen, or is substituted hydrocarbyl containing, besides atoms of carbon and hydrogen, other atoms such as oxygen, sulfur, nitrogen, and halogen, particularly halogen of atomic number from 9 to 35, which atoms are present in functional groups such as alkoxy, carboalkoxy, acyl, trihalomethyl, halo, cyano, dialkylamino, sulfonylalkyl, alkanoyloxy and like groups having no active hydrogen atoms. A preferred class of nonhydrocarbyl substituents comprises an atom having an atomic number from 7 to 8, i.e., nitrogen or oxygen, one valence of which is satisfied by bonding to an otherwise hydrocarbyl R substituent, and the remaining valence(s) are satisfied by bonding to lower alkyl radicals which are alkyl of from 1 to 4 carbon atoms. Such preferred nonhydrocarbyl substituents are alkoxy wherein the alkyl moiety is alkyl of from 1 to 4 carbon atoms and N,N-dialkylamino wherein each alkyl independently is alkyl of from 1 to 4 carbon atoms.

Illustrative of suitable aromatic R groups are hydrocarbyl aromatic groups such as phenyl, tolyl, xylyl, p-ethylphenyl, p-tert-butylphenyl, m-octylphenyl, 2,4-diethylphenyl, 2,4-dibenzylphenyl, p-phenylphenyl, m-benzylphenyl and 2,4,6-trimethylphenyl; as well as substituted hydrocarbyl aromatic groups such as p-methoxyphenyl, m - chlorophenyl, m - trifluoromethylphenyl, p - propoxyphenyl, p-carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5-bis(trichloromethyl)phenyl and 3-dibutylaminophenyl.

The $L_4Ni$ may be isolated from or prepared in situ from the reaction of a coordination complex of nickel, such as dicyclooctadineyl-nickel, bis-$\pi$-allylnickel and the like, with the ligand L, hereinabove defined; see, for example, B. Bogdanovic, M. Kroner and G. Wilke, Ann., 699, 17 (1966). An alternate method of preparation of the catalyst $L_4Ni$ comprises the in situ production thereof by treating a nickel salt with a reducing agent such as trihydrocarbylaluminum or (hydrocarbylhydrocarbyloxy) aluminum of from 3 to 35 carbon atoms per molecule or with hydrogen in the presence of ligand L; see, for example, R. D. Mullineaux, U.S. Pat. 3,290,348, Dec. 6, 1966.

In an alternate modification of the process of the invention, catalyst is introduced or produced in situ in a form represented by the formula $$L(R)(X)Ni$$

wherein L is defined hereinabove, R is $\pi$-allyl and X is an inorganic or organic anion such as halide, cyanide, acetylacetonate, acetate and the like. In this connection $\pi$-allyl is meant to include not only the unsubstituted allyl moiety ($-C_3H_5$) but also substituted moieties such as $\pi$-methallyl ($-C_4H_7$), $\pi$-crotyl ($-C_4H_7$), $\pi$-cyclohexenyl ($-C_6H_9$), $\pi$-cyclooctenyl ($-C_8H_{13}$) and the like. By way of illustration, this form of the catalyst may be conveniently obtained in situ by bringing together in the reaction zone $\pi$-allylnickel chloride or bromide and triphenyl phosphite, $\pi$-allylnickel cyanide and triphenyl phosphite, or $\pi$-cyclooctenylnickel acetylacetonate and triphenyl phosphine.

It has been found that the phosphite complexing ligand is preferably a triaryl phosphite of the formula $(RO)_3P$ wherein R independently is an aromatic hydrocarbyl group of up to 20 carbon atoms, i.e., an aromatic hydrocarbyl group of from 6 to 20 carbon atoms. Largely because of economic reasons triphenyl phosphite is a particularly preferred ligand.

An advantage of the nickel-containing catalysts of the invention is that they are easily prepared from nontoxic materials. Traditionally carbonyl-containing nickel compounds are prepared from nickel tetracarbonyl which is highly toxic.

The process of the invention is characterized by the requirement for only catalytic quantities of nickel compound. Although utilization of larger amounts of nickel-containing catalyst is not detrimental to the process of the invention, amounts larger than about 5 mole percent based on total reactants are not generally required. Amounts of nickel compound less than about 0.001 mole percent on the same basis are generally unsuitable because of the inevitable physical losses of catalyst during reaction and processing. In most instances, amounts of catalyst from about 0.01 mole percent to about 0.5 mole percent based on total reactants are satisfactory and are preferred.

The process of the invention is typically conducted by charging the reactants and catalyst to an autoclave or similar reactor and maintaining the reaction mixture at reaction temperature until reaction is complete. The method of mixing is not critical although it is generally preferred to mix the reactants and add the catalyst thereto. The reaction is suitable conducted throughout a wide range of reaction temperatures and pressures, so long as the reactants are maintained substantially in the liquid phase. Reaction temperatures from about —20° C. to about 100° C. are satisfactory, although temperatures from about 0° C. to about 90° C. are preferred and best results are obtained when a temperature from about 50° C. to about 80° C. is employed. Typical reaction pressures vary from about 1 atmosphere to about 80 atmospheres. Frequently, good results are obtained when the reaction pressure is autogenous, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. In the modification wherein solvent is employed, solvents that are suitable are those capable of dissolving the reactants and catalyst, and are inert to the reactants and the products prepared therefrom. Exemplary solvents are normally liquid ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; normally liquid aromatic hydrocarbons, such as benzene, toluene, and xylene; N,N-dialkyl alkanoic acid amides, e.g., dimethylformamide and N,N-diethylacetamide; halogenated hydrocarbons such as chloroform, carbon tetrachloride, tetrachloroethylene, methylene chloride and bromoform; sulfoxides such as dimethylsulfoxide, and nitriles such as acetonitrile and benzonitrile. The solvent, if any, is employed in molar excess over the amount of total reactants, and in general, moles of solvent up to about 150 moles per mole of total reactants are satisfactory. For convenience, it is generally preferred to conduct the reaction in the absence of added solvent whenever the physical characteristics of the reaction mixture, particularly the melting point, will allow.

Subsequent to reaction, the reaction mixture is separated and the desired product recovered by conventional means such as selective extraction, fractional distillation and chromatographic techniques.

The ether products of the invention are aryl alkadienyl ethers illustratively produced by dimerization of the diene reactant and reaction of the diene dimer with the phenol reactant to etherify at least one of the phenolic hydroxyl groups. The aryl alkadienyl ethers are described in the above-mentioned Canadian Pat. No. 794,394, issued Sept. 10, 1968, corresponding to copending U.S. application Ser. No. 455,965, filed May 14, 1965, now abandoned. In terms of the phenol reactants as previously defined, the products of the invention are aryl alkadienyl ethers wherein the alkadienyl moiety is 2,7-octadienyl or methyl-substituted 2,7-octadienyl depending upon the particular alkadiene reactant employed, and the aryl moiety is that moiety illustratively obtained by removal of at least one hydroxyl group of a mono- to di-nuclear phenol possessing from 1 to 3 phenolic hydroxyl groups on each six-membered carbocyclic aromatic ring. The octadienyl moiety will have from 0 to 4 methyl substituents, depending upon the degree of methyl substitution on the diene reactant. When butadiene is employed as the diene reactant, the alkadienyl moiety will be 2,7-octadienyl. Alternatively, when the diene reactant is isoprene, the alkadienyl moiety is principally 3,7 - dimethyl-2,7-octadienyl and/or 3,6 - dimethyl-2,7-octadienyl and when 2,3-dimethylbutadiene is the diene reactant, the alkadienyl moiety is 2,3,6,7 - tetramethyl-2,7-octadienyl. Generically these alkadienyl moieties are represented by the formula

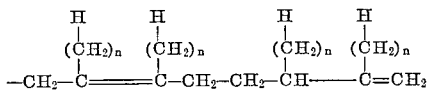

wherein $n$ independently is a whole number from 0 to 1 inclusive. Although it is within the contemplated scope of the invention to prepare alkadienyl ethers of polyhydric phenols wherein only a portion of the phenolic hydroxyl groups within the phenol reactant molecule are etherified, the preferred products of the invention are those wherein each phenolic hydroxyl present within the phenol reactant has been etherified with an alkadienyl moiety as previously defined.

It will be apparent that a wide variety of aryl alkadienyl ethers can be prepared by the process of the invention by varying the phenol and diene reactants. Illustrative of these products are 1-phenoxy-2,7-octadiene prepared from phenol and butadiene, 1-phenoxy-3,6-dimethyl-2,7-octadiene and 1 - phenoxy-3,7-dimethyl-2,7-octadiene prepared from phenol and isoprene, and 1-phenoxy-2,3,6,7-tetramethyl - 2,7-octadiene prepared from phenol and 2,3-dimethylbutadiene, as well as other illustrative products such as 1-(p-chlorophenoxy)-2,7-octadiene, 1-(2,6-diethylphenoxy)-3,6-dimethyl-2,7-octadiene, 2,2-bis[4-(2,7-octadienyloxy)phenol]propane, 1,4 - bis(2,7-octadienyloxy)-benzene, 1,5-bis(3,7-dimethyl-2,7-octadienyloxy)naphthalene, 3,3' - bis - (2,3,6,7-tetramethyl-2,7-octadienyloxy)-biphenyl, 1-(p-methoxyphenoxy)-2,7-octadiene, 1-(3,5-dibromophenoxy) - 2,7-octadiene, bis[3,6-dimethyl-2,7-octadienyloxy)phenyl]methane and the like.

The ether products of the invention are useful in a variety of applications. The unsaturated linkages can be hydrated or hydroxylated to form useful alcohol derivatives from which can be prepared esters or ethers. The ethylenic linkage serves as a dienophile in Diels-Alder condensations or as a reactive site for polymerization or copolymerization processes. The ether products may be hydrolyzed to form useful alkadienols, e.g., 2.7-octadienol from which esters, sulfonates, sulfates, and the like are prepared; for example, phthalic acid is esterified with 2,7-octadienol, to give di(2,7-octadienyl)phthalate, which is useful as a plasticizer for polyvinyl chloride and which upon polymerization yields a polyester resin. The ether products also may be treated with organic peracids for the conversion of the ethylenic linkages into epoxy groups as described in copending application of W. De Acetis et al., U.S. Ser. No. 456,001, filed May 14, 1965, now U.S. Pat. No. 3,432,465, issued Mar. 11, 1969. For example, 1-(2,4-dichlorophenoxy)-2,7-octadiene is reacted with peracetic acid to obtain the monoepoxides of 1-(2,4-dichlorophenoxy)-2,7-octadiene and/or the diepoxide; 1-(2,4-dichlorophenoxy)-2,3-epoxy-7-octene, 1 - (2,4 - dichlorophenoxy)-7,8-epoxy-2-octene, and 1-(2,4-dichlorophenoxy)-2,3,7,8-diepoxyoctane are each useful for the production therefrom of resin products. The unsaturated monoepoxides, 1 - (2,4 - dichlorophenoxy)-2,3-epoxy-7-octene and 1 - (2,4 - dichlorophenoxy - 7,8 - epoxy-2-octene, are first polymerized (polymerization of the ethylenic linkage) by heating with about 5% by weight of tert-butyl hydroperoxide or di(tert-butyl)peroxide and then cured (polymerization of the epoxide groups) by heating with an epoxy curing agent, e.g., about 15% by weight of phthalic anhydride. The diepoxide, 1-(2,4-dichlorophenoxy)-2,3,7,8-diepoxyoctane, is cured by mixing a curing agent, e.g., about 12% by weight of diethylenetriamine, with the diepoxide and heating.

EXAMPLE I

To a stainless-steel bomb were charged 2.2 moles of phenol, 9.6 moles of butadiene and 0.02 mole of tetrakis-(triphenyl phosphite)-nickel dissolved in 800 ml. of benzene. The bomb was sealed and maintained at 80° C. for 48 hours. The bomb was then cooled and the product mixture removed. Gas-liquid chromatographic (GLC) analysis of the product mixture indicated a conversion of 75% based on phenol charged with a 54% selectivity to 1-phenoxy-2,7-octadiene. Other materials formed in minor amounts were 3-phenoxy-1,7-octadiene, phenoxybutene, 1,3,7-octatriene and 1,5-cyclooctadiene.

EXAMPLE II

To a stainless-steel bomb were charged 2.24 moles of phenol, 12.0 moles of butadiene, 0.042 mole of dicyclooctadienylnickel dissolved in 340 ml. of benzene and 0.048 mole of triphenyl phosphite. The bomb was sealed and maintained at 80° C. for 40 hours. The bomb was then cooled and the product mixture removed. GLC analysis of the product mixture indicated a conversion of 90% based on phenol charged with a 72% selectivity to 1-phenoxy-2,7-octadiene. Other materials formed in minor amounts were 3-phenoxy-1,7-octadiene, phenoxybutene, 1,3,7-octatriene and 1,5-cyclooctadiene.

EXAMPLE III

A series of experiments was conducted in accordance with the method of Example II at varying temperature for 120 hours. The catalyst employed was 0.019 mole of dicyclooctadienylnickel in 250 ml. of benzene with 0.019 mole of triphenyl phosphite. The results of this series are shown in Table I.

TABLE I

| Butadiene, moles | Phenol, moles | Temperature, °C. | Conversion, percent | Selectivity [1] |
|---|---|---|---|---|
| 4.8 | 1.1 | 38 | 98 | 74 |
| 4.8 | 2.2 | 38 | 95 | 55 |
| 4.8 | 1.1 | 52 | 93 | 71 |
| 4.8 | 2.2 | 52 | 98 | 59 |

[1] To 1-phenoxy-2,7-octadiene, percent.

EXAMPLE IV

To a stainless-steel bomb were charged 0.13 mole of π-allylnickel cyanide, 0.23 mole of triphenyl phosphite, 9.6 moles of butadiene and 2.2 moles of phenol. The bomb was sealed and maintained at 80° C. for 48 hours. The bomb was then cooled and the product mixture removed. GLC analysis of the product mixture indicated a conversion of 95% based on phenol charged with 60% selectivity to 1-phenoxy-2,7-octadiene. Other materials formed in minor amounts were 3-phenoxy-1,7-octadiene, phenoxybutene 1,3,7-octatriene and 1,5-cyclooctadiene.

EXAMPLE V

To a stainless-steel bomb were charged 0.09 mole of tetrakis[tris(o-phenylphenyl)phosphite]nickel, 9.6 moles of butadiene and 2.2 moles of phenol. The bomb was sealed and maintained at 80° C. for 48 hours. The bomb was then cooled and the product mixture removed. GLC analysis of the product mixture indicated a conversion of 61% based on phenol charged with an 83% selectivity to 1-phenoxy-2,7-octadiene. Other materials formed in minor amounts were 3-phenoxy-1,7-octadiene, phenoxybutene, 1,3,7-octatriene and 1,5-cyclooctadiene.

EXAMPLE VI

To a stainless-steel bomb were charged 2.2 moles of phenol, 9.6 moles of butadiene and 0.02 mole of tetrakis (triphenyl phosphite)nickel dissolved in 800 ml. of benzene. The bomb was sealed and maintained at 80° C. for 48 hours. The bomb was then cooled and the resulting mixture removed. Exposure to air inactivated the catalyst by air oxidation. Subsequent fractional distillation of the product mixture yielded 177 g. of 1-phenoxy-2,7-octadiene, B.P. 112–114° C. at 0.7 mm. Hg. Other materials formed in minor amounts were 3-phenoxy-1,7-octadiene, phenoxybutene, 1,3,7-octatriene and 1,5-cyclooctadiene.

We claim as our invention:

1. The process of producing aryl alkadienyl ether by reacting a hydroxy compound having 6 to 24 carbon atoms selected from the group consisting of mononuclear hydrocarbon phenols, dinuclear hydrocarbon phenols and nuclear halogenated derivatives thereof and having 1 to 2 phenolic hydroxyl groups attached to each aromatic ring with from about 0.25 to about 5 moles per mole of phenolic hydroxyl group of a conjugated diene comprising vicinal dimethylidene alkane of from 4 to 6 carbon atoms at a temperature from about —20° C. to about 100° C. and a pressure of from about 1 atmosphere to about 80 atmospheres, in the presence of, as catalyst, from about 0.001 mole percent to about 5 mole percent based on total reactants of nickel complexed with $(RO)_3P$, wherein R independently is an aromatic hydrocarbyl group of up to 20 carbon atoms.

2. The process according to claim 1 wherein the aryl alkadienyl ether produced is aryl 2,7-octadienyl ether, and the conjugated diene is butadiene.

3. The process according to claim 2 wherein the aryl 2,7-octadienyl ether is 1-phenoxy-2,7-octadiene, the phenol reactant is phenol, the nickel complex is tetrakis (triphenyl phosphite)nickel and the process is conducted at a temperature from about 0° C. to about 90° C.

4. The process according to claim 2 wherein the nickel complex is produced in situ from the interaction of a nickel complex selected from the group consisting of dicyclooctadienylnickel bis - π - allylnickel, π - allylnickel chloride, π-allylnickel bromide, π-allylnickel cyanide and π-cyclooctenylnickel acetylacetonate and a ligand of the formula $(RO)_3P$, wherein R independently is an aromatic hydrocarbyl group of up to 20 carbon atoms.

References Cited
UNITED STATES PATENTS

| | | | |
|---|---|---|---|
| 3,489,813 | 1/1970 | Dewhirst | 260—611 A |
| 3,518,315 | 6/1970 | Smutny | 260—612 D |
| 3,530,187 | 9/1970 | Shryne | 260—612 D X |

HOWARD T. MARS, Primary Examiner

U.S. Cl. X.R.

260—289 R, 612 R, 613 D, 613 R